United States Patent
Ament et al.

[11] Patent Number: 5,876,064
[45] Date of Patent: Mar. 2, 1999

[54] PROTECTIVE DEVICE FOR AN INTERIOR OF A MOTOR VEHICLE

[75] Inventors: Eduard Ament, Aichwald; Holger Seel, Aidlingen, both of Germany

[73] Assignee: Baumeister + Ostler GmbH & Co. KG, Aichwald/Aichschiess, Germany

[21] Appl. No.: 801,803

[22] Filed: Feb. 14, 1997

[30] Foreign Application Priority Data

Feb. 17, 1996 [DE] Germany ............... 196 05 907.0

[51] Int. Cl.⁶ .................................................. B60R 21/06
[52] U.S. Cl. ........................................................ 280/749
[58] Field of Search ...................... 280/748, 749

[56] References Cited

U.S. PATENT DOCUMENTS

| | | | |
|---|---|---|---|
| 3,423,121 | 1/1969 | Lipkin | 280/749 |
| 3,525,535 | 8/1970 | Kobori | 280/749 |
| 4,043,582 | 8/1977 | Lyter | 280/749 |
| 5,462,308 | 10/1995 | Seki et al. | 280/749 |

FOREIGN PATENT DOCUMENTS

| | | |
|---|---|---|
| 65940/94 | 1/1995 | Australia . |
| 0 649 788 | 4/1995 | European Pat. Off. . |
| 0 683 073 | 11/1995 | European Pat. Off. . |
| 41 28 526 | 3/1992 | Germany . |
| 41 28 527 | 3/1992 | Germany ............... 280/749 |
| 41 28 554 | 3/1992 | Germany . |
| 41 28 555 | 3/1992 | Germany . |
| 41 28 701 | 3/1992 | Germany ............... 280/749 |
| 41 28 702 | 3/1992 | Germany . |
| 2 078 180 | 1/1982 | United Kingdom . |
| 2 133 355 | 7/1984 | United Kingdom . |
| 2 135 639 | 9/1984 | United Kingdom ............ 280/749 |
| 2 276 593 | 10/1994 | United Kingdom . |
| 2 291 841 | 2/1996 | United Kingdom . |

*Primary Examiner*—Kenneth R. Rice
*Attorney, Agent, or Firm*—Evenson, McKeown, Edwards & Lenahan, P.L.L.C.

[57] ABSTRACT

A protective device for an interior of a motor vehicle having flexible flat structure stretched in a rigid frame. The frame is mounted to move between a resting position and a protective position.

21 Claims, 7 Drawing Sheets

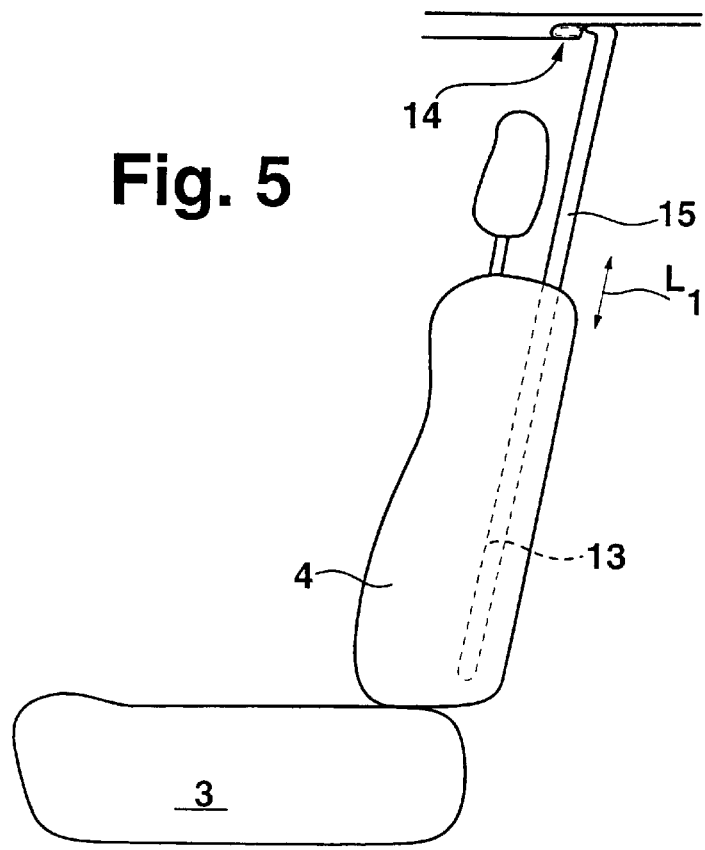
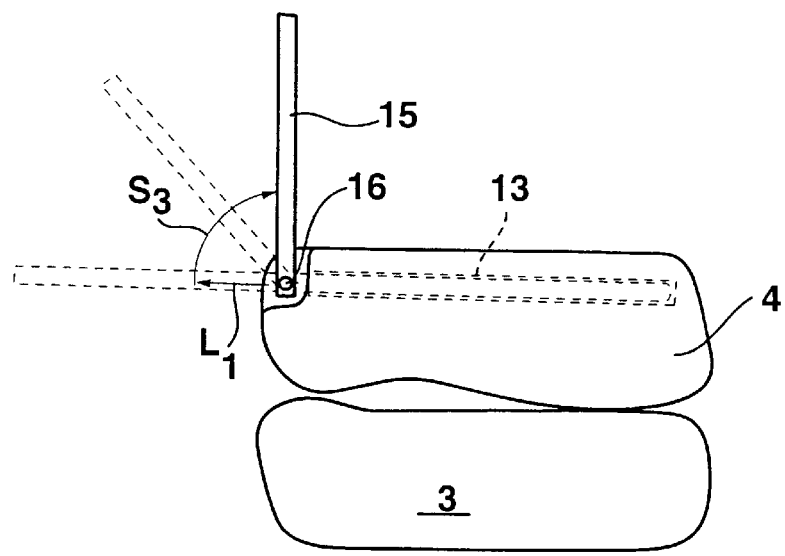

PROTECTIVE DEVICE FOR AN INTERIOR OF A MOTOR VEHICLE

BACKGROUND AND SUMMARY OF THE INVENTION

The invention relates to a protective device for an interior of a motor vehicle with a flexible flat structure that can be transferred from at least one stored resting position into at least one protective position that separates a cargo area from a passenger area and back into the at least one resting position.

In station wagons it is known to use a roller-shade housing to store a flexible flat structure in the form of a safety net that separates a cargo area from a passenger area of the vehicle interior, said net being rolled up and pulled out upward when needed. The roller-shade housing is releasably mounted in the vicinity of a rear surface of a backrest of a front seat bench. The safety net can be pulled out upward approximately vertically both when the backrest is upright and when it is folded forward, and can be suspended from mounts that are integral with the roof. Since the safety net is flexible, it is possible that during violent vehicle deceleration, cargo can be hurled laterally against the safety net in the vicinity of the side edges of the net, between the side edges of the net and the side windows or the side interior trim and pass forward from the cargo area into the passenger area.

A goal of the present invention is to provide a protective device of the type generally described above to provide improved protective for the passenger area.

This and other goals have been achieved according to the present invention by stretching the flexible flat structure in a rigid frame, said frame being mounted so that it can move between the resting position and the protective position. By using a rigid frame, the flat structure has an increased retention capability in the vicinity of its side edges as well, resulting in improved separation between the cargo area and the passenger area and thus offer improved protective for the passenger area as well.

In one embodiment of the invention the frame is pivotably mounted on the roof interior trim and arranged to rest flat in its resting position against the roof. In its resting position the frame, including the flat structure stretched therein does not reduce the available space in the interior and especially in the cargo area, since it lies against the roof. Especially advantageously, the frame is mounted so that it is recessed in its resting position in a matching depression in the roof.

In another embodiment of the invention, holding receptacles are provided on the roof, running lengthwise of the vehicle and spaced apart from one another, in which receptacles the frame can optionally be releasably secured to form a pivoting mount. It is then advantageously possible to lock the frame, in the vicinity of its upper cross member as well as in the vicinity of its lower cross member, in the retaining receptacles so that with a suitable spacing of two adjacent retaining receptacles with respect to one another, the frame can be secured to lie flat against the roof.

In another embodiment of the invention, a retaining receptacle is located on the roof at the location of the backrests of the front seats and at the location of the backrests of the rear seats. In this way the frame can produce a separation between the passenger area and the cargo area both at the location of the backrests of the rear seats and also at the location of the backrests of the front seats when the backrests of the rear seats are folded down.

In another embodiment of the invention the height of the frame is greater than the distance between the roof and the backrests of the front seats or of the rear seats. If the frame is pivotably mounted on the roof, locking of the lower part of the frame in the protective position on the backrests is not required since the frame is in any case supported in this area at the rear on the respective backrests and thus offers secure retention for cargo in the cargo area in the-event of a violent vehicle deceleration.

In another embodiment of the invention, a small additional frame is integrated into the frame and is mounted movably thereon, and can be transferred independently of the frame into a protective position. This is especially advantageous when the protective device is intended to offer a secure separation between the cargo area and the passenger area both when the backrests of the rear seats are upright and when the backrests of the rear seats are folded forward, since the smaller additional frame and the large frame can have dimensions such that the additional frame forms the protective position when the backrests are upright and the large frame forms the protective position when the backrests are folded down.

In another embodiment of the invention, a flexible covering is provided on the underside of the frame, said covering covering a space between the front seats when the frame is in a forward protective position, with the covering having associated with it a mount integral with the floor to hold it in its protective position. This additional flexible covering is advantageous either when the frame is mounted in the vicinity of the roof or when the frame is held releasably on the backrests of the rear seats, and is removed from these mounts on the backrests to assume its protective position when the backrests are folded down and is then fastened in the vicinity of the roof. In both cases the flexible covering is pulled downward from the frame and connected to the vehicle floor.

In another embodiment of the invention the frame has mounting receptacles for a roller-shade housing of a safety net that can be pulled out. As a result the roller-shade housing can be optionally mounted on either the backrest or the frame when the backrest is folded down, and in the second case the safety net can be pulled out of the frame into its protective position.

Other objects, advantages and novel features of the present invention will become apparent from the following detailed description of the invention when considered in conjunction with the accompanying drawings.

BRIEF DESCRIPTION OF THE DRAWINGS

FIG. 5 is a schematic side view of another embodiment of a protective device according to the present invention in which the frame is mounted in a linearly displaceable fashion in a backrest;

FIG. 6 shows the protective device according to FIG. 5 with a frame that has been pushed out of the linear guide in the backrest, and pivoted upward;

DETAILED DESCRIPTION OF THE DRAWINGS

A station wagon has an interior divided into a passenger area and a cargo area. Two front seats are provided in the interior. These front seats are abutted at the rear by a rear area provided with rear seats (3, 4). In the embodiment shown, the seat cushions of the rear seats are formed by a continuous seat bench (3), and backrest (4) of the rear seat bench is divided into two parts asymmetrically. Backrest (4), divided into two parts, can be folded down and forward into an approximately horizontal position to increase the size of the cargo area, with each of the two parts of backrest (4), divided into two parts, being foldable separately. To separate the cargo area from the passenger area of the interior, various embodiments of protective devices according to the invention are described with reference to FIGS. 1 to 14 below, all of which permit a separation of the cargo area from the passenger area both when backrest (4) is upright and also when backrest (4) is tilted forward. In the embodiments described in greater detail below, according to FIGS. 9 and 10, 11 and 12, and 13 and 14, the respective protective device is subdivided into two parts located side by side across the width of the vehicle, each of said parts being associated with a part of the backrest, divided into two parts, of the rear seat bench. Of course these protective devices are also provided as undivided embodiments that extend continuously over the entire width of the interior.

Figure 1:
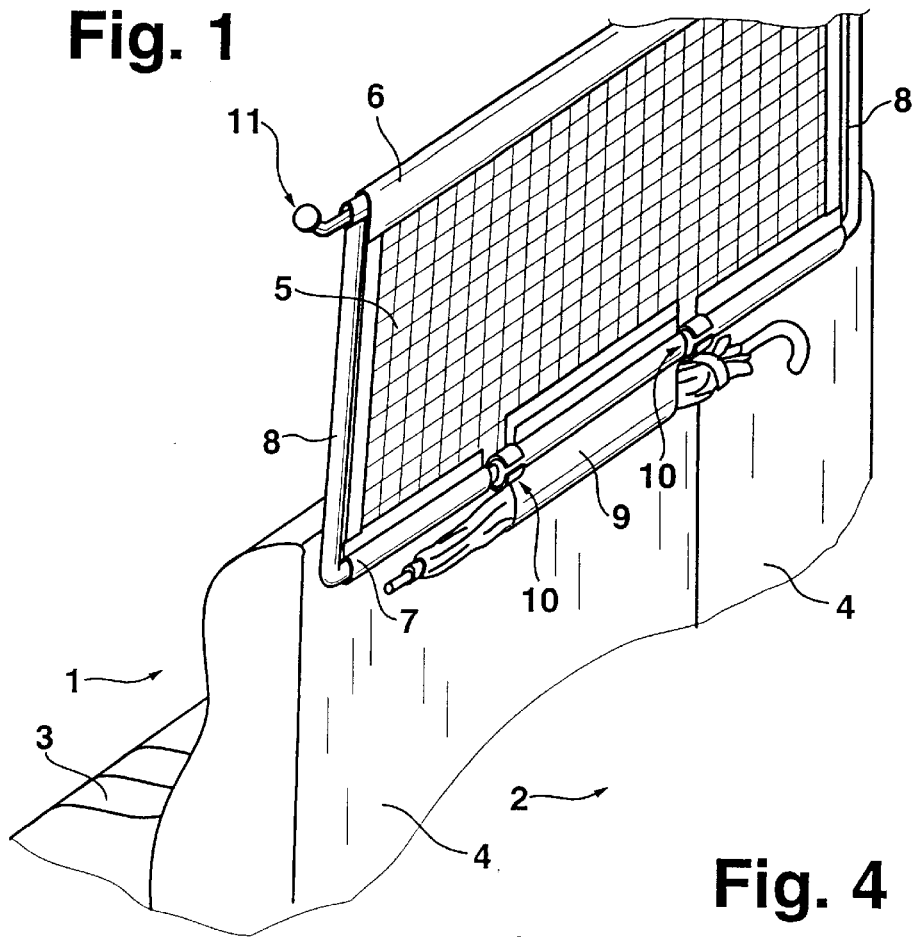
FIG. 1 is a perspective view of a first preferred embodiment of a protective device according to the present invention in which a frame provided with a safety net stretched over it is mounted releasably on the backrests of the rear seats.
Figure 2:
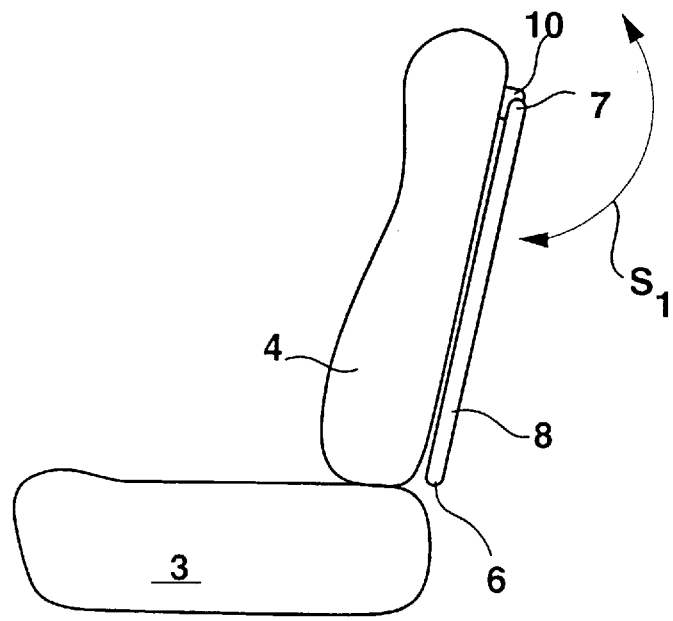
FIG. 2 is a schematic side view of the protective device according to FIG. 1 in its resting position, in which it abuts the backrests of the rear seats.
Figure 3:
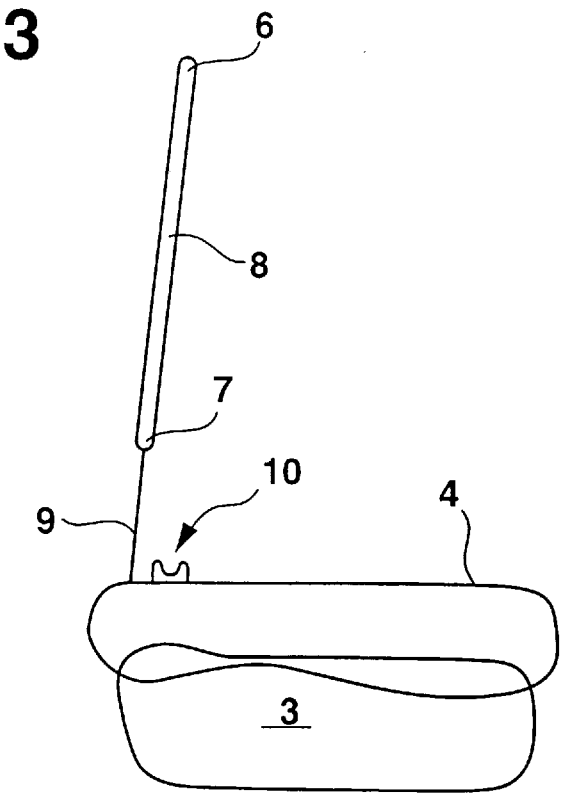
FIG. 3 shows the protective device according to FIGS. 1 and 2 in its forward protective position, in which the backrests of the rear seats are folded forward and the protective device is positioned immediately behind the backrests of the front seats.

In the embodiment according to FIGS. 1 to 3 the protective device comprises a stable trapezoidal frame (6, 7, 8) that extends over nearly the complete width of backrest (4) of rear seat bench (3, 4) and separates a passenger area (1) from a cargo area (2), with frame (6, 7, 8), in a protective position in which it extends as an extension of backrest (4) up to the roof (not shown) Trapezoidal frame (6, 7, 8) is made tubular and manufactured either from a light metal or plastic. At its upper end, and hence in the vicinity of its upper cross member (6), frame (6, 7, 8) is provided on each side with a suspension pin (11), said pins being lockable into receptacles integral with the interior in the vicinity of the roof. In the vicinity of its lower cross member (7), frame (6, 7, 8) is held releasably in locking receptacles (10) that simultaneously form the bearings for pivotable mounting of frame (6, 7, 8) These bearings form a horizontal pivot axis for frame (6, 7, 8), by means of which frame (6, 7, 8) is mounted so that it can pivot relative to backrest (4) of the rear seat bench. A flexible flat structure in the form of a stable safety net (5) is stretched within frame (6, 7, 8). In its resting position (FIG. 2) frame (6, 7, 8) is stored together with safety net (5) against the back of backrest (4), which in this case is folded downward around the pivot axis and is locked in the resting position in which it abuts the rear of backrest (4) by a latch, not shown in greater detail. In order to bring frame (6, 7, 8) from its resting position into its protective position as shown in FIG. 1, the latch is released in simple fashion and then frame (6, 7, 8) is pivoted upward around bearings (10) in the direction of arrow ($S_1$). In this position, retaining pins (11) are latched into the corresponding receptacles on the roof, so that the protective position is secured. In order to provide a separation between the passenger area at the location of the rear seats and the rear cargo area even when backrest (4) is folded forward (FIG. 3), lower cross member (7) and hence the entire frame (6, 7, 8) is unlatched from bearings (10) and suspended in corresponding mounts at the roof at the location of the front seats. Frame (6, 7, 8) now has its lower cross member (7) abutting the backs of the backrests of the front seats in a manner not shown. In order also to separate the space left between the two front seats at the location of the drive tunnel, the frame (6, 7, 8) also has a flexible cover (9) associated with it in the form of a flat fabric structure that is secured in its resting position like a pocket on frame (6, 7, 8) (FIG. 1). In this resting state it can serve as a storage location for elongated objects. By unbuttoning half of cover. (9), the lower end of cover (9) hangs down and can be secured to a mount integral with the seat (not shown) as indicated in FIG. 3, with both covering (9) and frame (6, 7, 8) being stretched approximately vertically. Seat-integral mounting simultaneously constitutes a mount that is integral with the floor, since the back of the backrest in the position shown forms the floor of the cargo area. Securing it in this manner to the mount thus provides a safe separation at the location of the front seat that reliably keeps cargo from being hurled from the cargo area into the passenger area.

Figure 4:
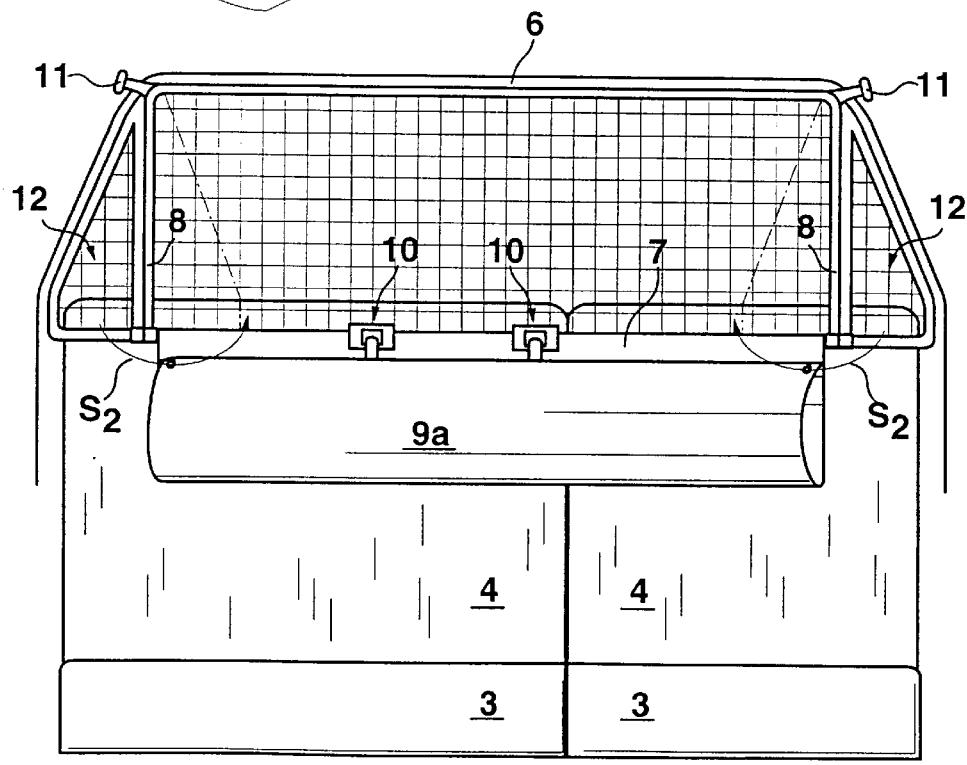
FIG. 4 shows another protective device according to the present invention similar to that in FIG. 1, in which the frame is provided with additional windows that fold out laterally.

The embodiment according to FIG. 4 essentially corresponds to the embodiment described above. In this protective device, covering (9a) is merely made considerably wider and frame (6, 7, 8) is additionally provided with wings (12) that can be deployed in the vicinity of its side members (8), said wings, following their lateral deployment outward as indicated by arrows ($S_2$), separating a trapezoidal area similar to that of frame (5, 6, 7, 8) according to FIG. 1. Wings (12) are also designed framewise and provided with an integrated stretched safety net part.

In the embodiment according to FIGS. 5 and 6, a stable frame (15) is also provided in which a flat structure is stretched in a manner not shown. Frame (15) is mounted in a linear guide (13) that is located on the back of backrest (4) of the rear seat bench and is integrated into backrest (4). Frame (15) can be pushed out upward in the direction of double arrow ($L_1$) and inserted positively in its upper end position in a latching receptacle (14) mounted on the roof. In order to permit separation by frame (15) even when backrest (4) is folded forward, linear guide (13) for frame (15) is also provided with a pivoting hinge (16) for additional pivot mounting of frame (15) in its extended protective position in the direction of arrow ($S_3$). Of course latches are associated with pivot mount (16) that permit locking frame (15) in the vertical protective position shown in FIG. 6 and in the protective position shown in FIG. 5 in which it is coaxial with linear guide (13).

Figure 7:
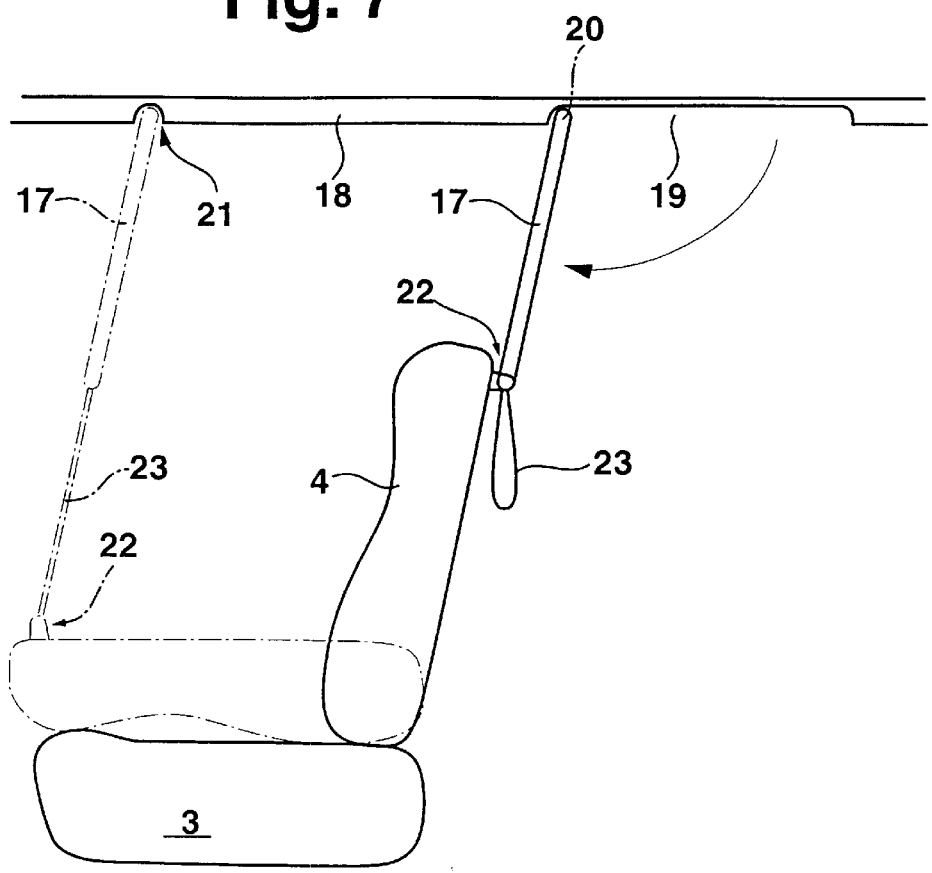
FIG. 7 shows another embodiment of a protective device according to the present invention in which the frame is pivotably mounted on the roof.

In the embodiment according to FIG. 7, the protective device likewise has a one-piece rectangular or trapezoidal frame provided with a flat structure stretched therein. In this embodiment, however, frame (17) is pivotably mounted on a pivot axis (20) at roof (18). In its resting position, frame (17) is recessed into a matching depression (19) in roof (18). In order to reach its protective position when backrest (4) of the rear seat bench is vertical, frame (17) is unlocked in simple fashion from its resting position and, after pivoting downward, is releasably locked in a mount (22) especially a latching receptacle, located on the back of backrest (4). Mount (22) is a pocket-like receptacle (23) resembling covering (9, 9a) according to FIGS. 1 to 4, one end of which is securable to the lower cross member of frame (17). Frame (17) is mounted releasably to roof (18) in the vicinity of pivot axis (20). At a distance from pivot axis (20), an additional retaining mount (21) for frame (17) is provided on roof (18), in which mount frame (17) can be releasably secured. This retaining mount (21) is provided for the front protective position of frame (17), in which backrest (4) is folded forward to enlarge the cargo area. The flat structure mounted on mount (22) in this front protective position connects the lower cross member of frame (17) with backrest (4) so that frame (17) and flat structure (23) are aligned in a stretched state-in which they are flush with one another.

Figure 8:
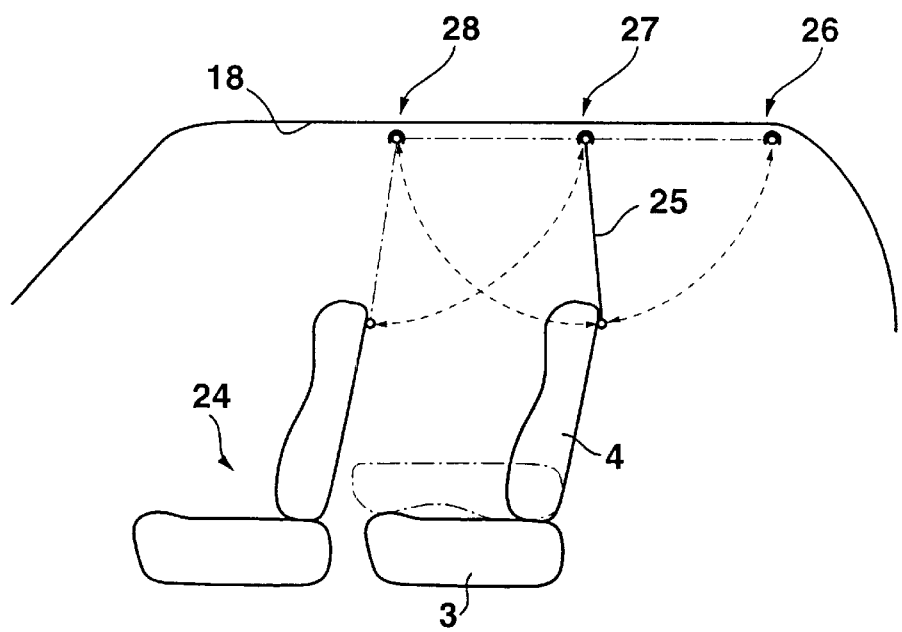
FIG. 8 shows another embodiment of a protective device according to the present invention in which the frame is releasably lockable at both ends to provide a pivoting mount.

In the embodiment according to FIG. 8, a frame (25) is provided that essentially corresponds to the frames described above. Frame (25) is articulated to the roof, with three latching receptacles (26, 27, 28) arranged at equal intervals from one another being provided, distributed over the length of the interior on roof (18). The intervals between the latching receptacles are adjusted precisely to the location of frame (25), with each latching receptacle (26, 27, 28) gripping the lower or upper cross member of frame (25) like jaws, so that frame (25) is secured to roof (18) but is simultaneously held so that it is free to pivot. Frame (25) is releasably lockable by both its front and its rear cross members in latching receptacles (26, 27, 28) so that it can either be stored directly against roof (18) as indicated by the dot-dashed lines or can be lowered into a protective position in which it abuts the backrests of front seats (24) or of rear seat bench (3, 4) (dotted arrows indicating pivoting). Frame (25) can therefore be placed against either front seats (24) or rear seat bench (3, 4). In a manner not shown, additional latching receptacles can be provided on the backs of the backrests for frame (25), said receptacles securing the respective protective positions of frame (25).

Figure 9:
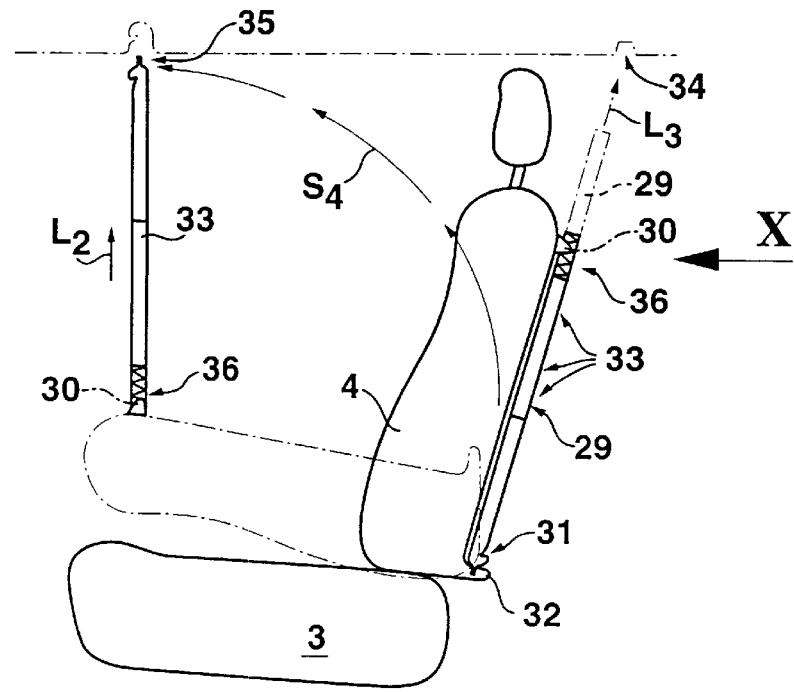
FIG. 9 shows another embodiment of a protective device according to the present invention in which the frame has an additional frame that is integrated and linearly displaceable.

As mentioned earlier, the protective devices according to FIGS. 9 to 14 are each divided into two parts, with the division into two parts corresponding to the asymmetric division of the backrest (4) of rear seat bench (3, 4). However, the respective parts are structured identically to one another as far as their function is concerned, so that for the sake of simplicity only one of the two parts will be described in detail. The protective device according to FIG. 9 and 10 has a main frame (33a, 33b) for each part that is mounted pivotably on a pivot axis (30) on the back of backrest (4). A smaller additional frame (29) is integrated into main frame (33a, 33b), said frame (29) being displaceable in a linearly movable fashion in the plane of main frame (33a, 33b) (arrow $L_3$). In its resting position in which additional frame (29) is inserted into main frame (33), main frame (33) and additional frame (29) form a common large frame. The height of this common large frame is dimensioned so that this common large frame, when backrest (4) is folded forward, is lockable in a front latching receptacle (35) on the roof (FIG. 9). In its resting position, the large frame and hence main frame (33) as well as smaller additional frame (29) abut the back of backrest (4) and are locked by latching area (31) in the vicinity of a latching receptacle (32) that is integral with the backrest. In this position, additional frame (29) can be pulled out linearly upward (arrow $L_3$) and locked independently of main frame (33) and secured in a receptacle (34) integral with the roof. After additional frame (29) has been pushed back into the resting position, and after backrest (4) has been folded forward, the entire frame (29, 33) can be pivoted forward and latched in latching receptacle (35) on the roof. In order to facilitate the latching and unlatching of frame (33), the protective device also has associated with it a compression spring arrangement (36) that presses the entire frame upward into latching receptacle (35) in the direction of arrow ($L_2$). The entire frame (33) pivots in the direction of arrow ($S_4$).

Figure 10:
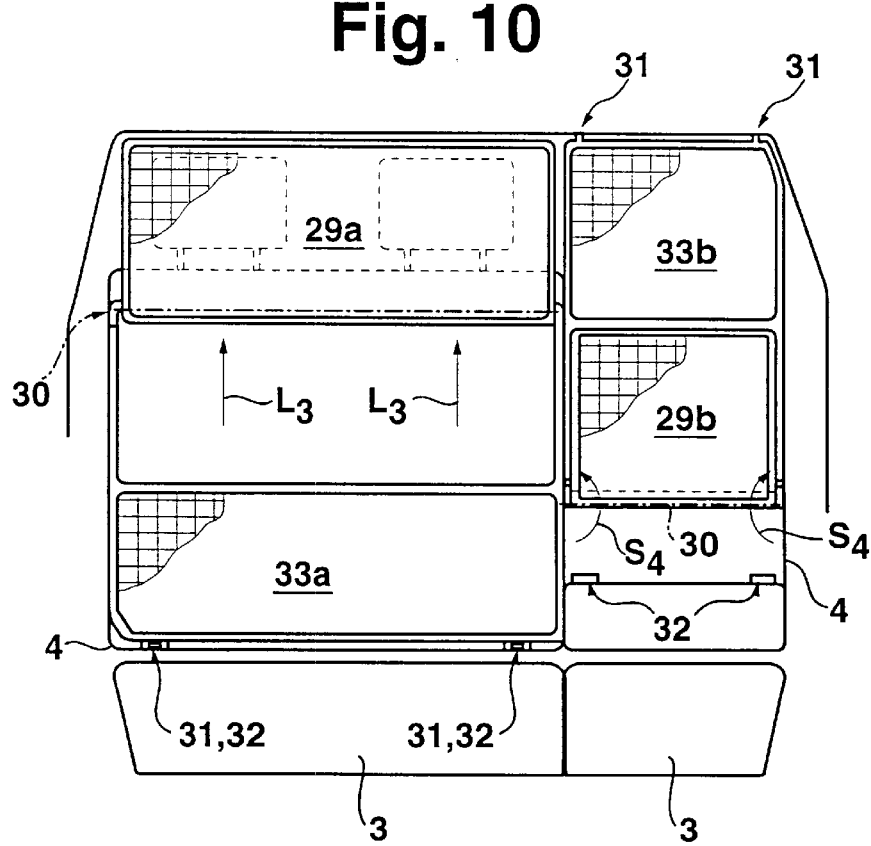
FIG. 10 is a view of the protective device according to FIG. 9 looking in the direction of arrow (X) in FIG. 9.
Figure 11:
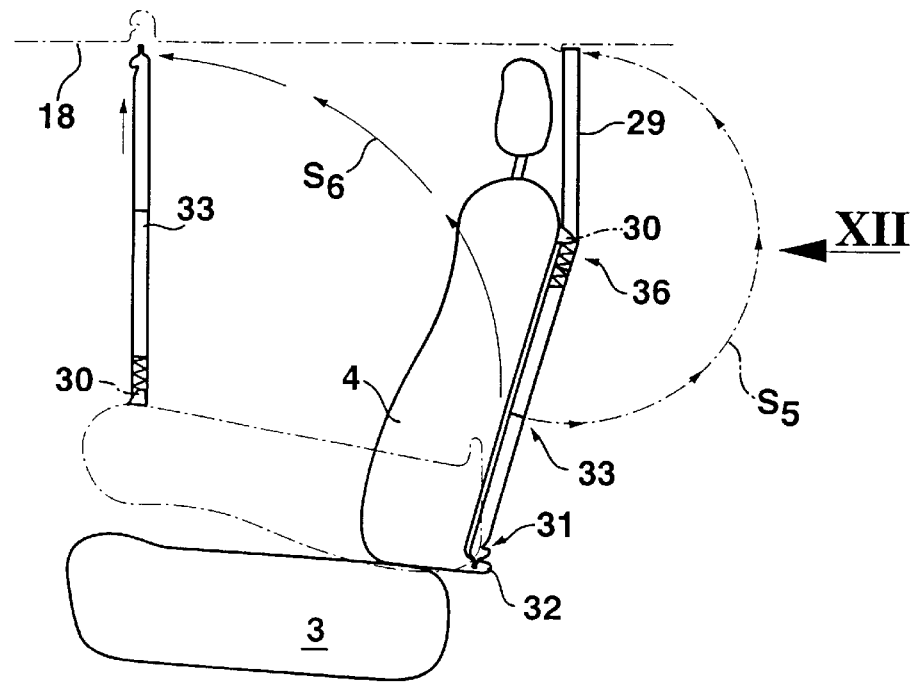
FIG. 11 is another embodiment of a protective device according to the present invention in which the frame likewise has an integrated additional frame.
Figure 12:
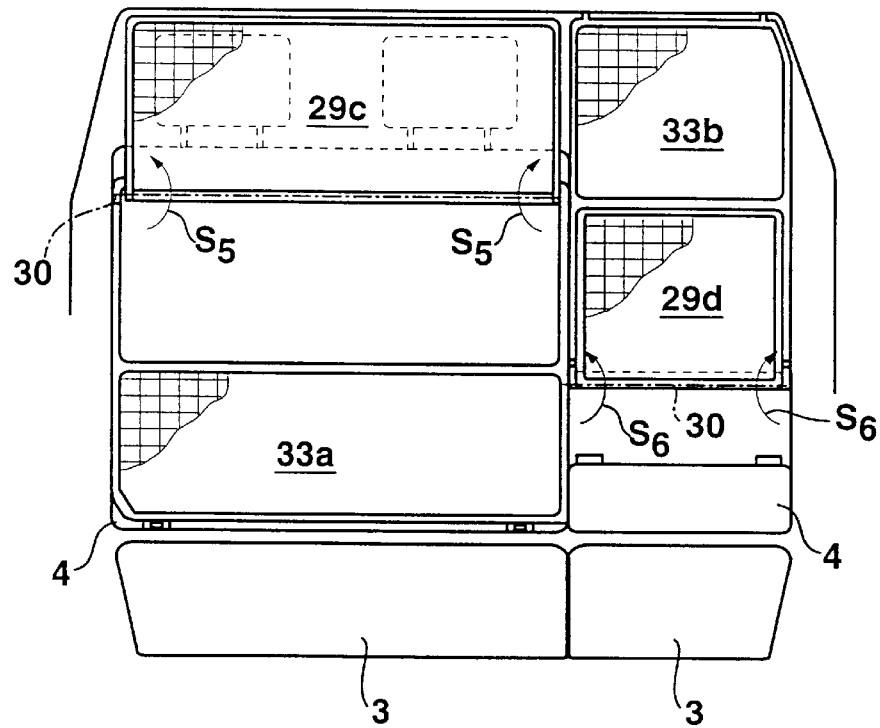
FIG. 12 is a view of the protective device according to FIG. 11 looking in the direction of arrow (XII) in FIG. 11.

The embodiment of the protective device according to FIGS. 11 and 12 is designed to be similar to the protective device according to FIGS. 9 and 10. This protective device also has a main frame (33) in which an independently movable additional frame (29, 29c, and 29d) is integrated. The only difference from the embodiment described above is that this additional frame (29) is not mounted to be linearly movable but to be pivotable around common pivot axis (30) on backrest (4) and relative to main frame (33) (arrow $S_5$). Latches are associated with the pivot bearing that secure the end positions of additional frame (29), namely its resting position in main frame (33) and its protective position. As also found in the embodiment according to FIGS. 9 and 10, the common large frame composed of additional frame (29) and main frame (33) is pivotable upward as indicated by arrows ($S_6$) when backrest (4) is folded.

Figure 13:
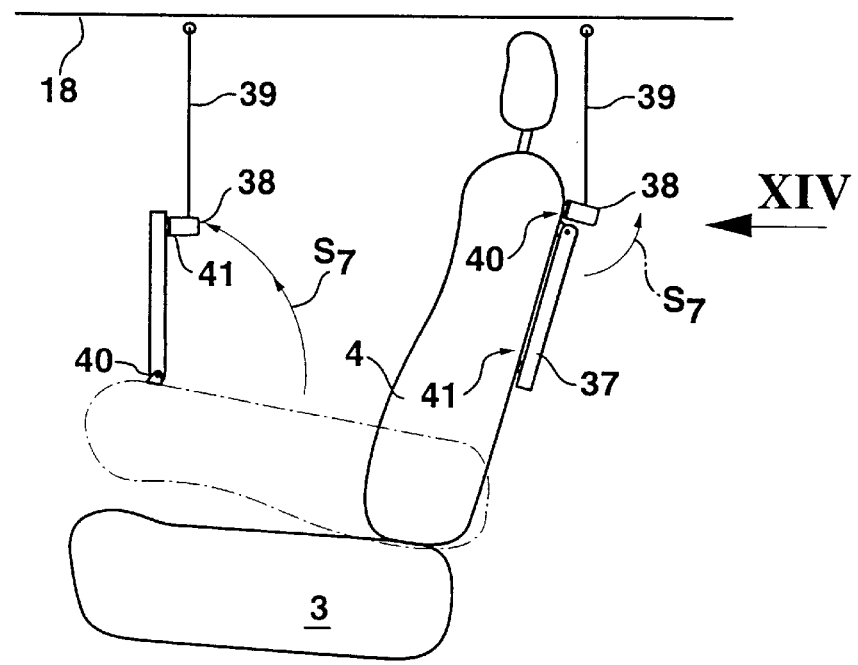
FIG. 13 shows another embodiment of a protective device according to the present invention in which the frame is combined with a protective roller shade.
Figure 14:
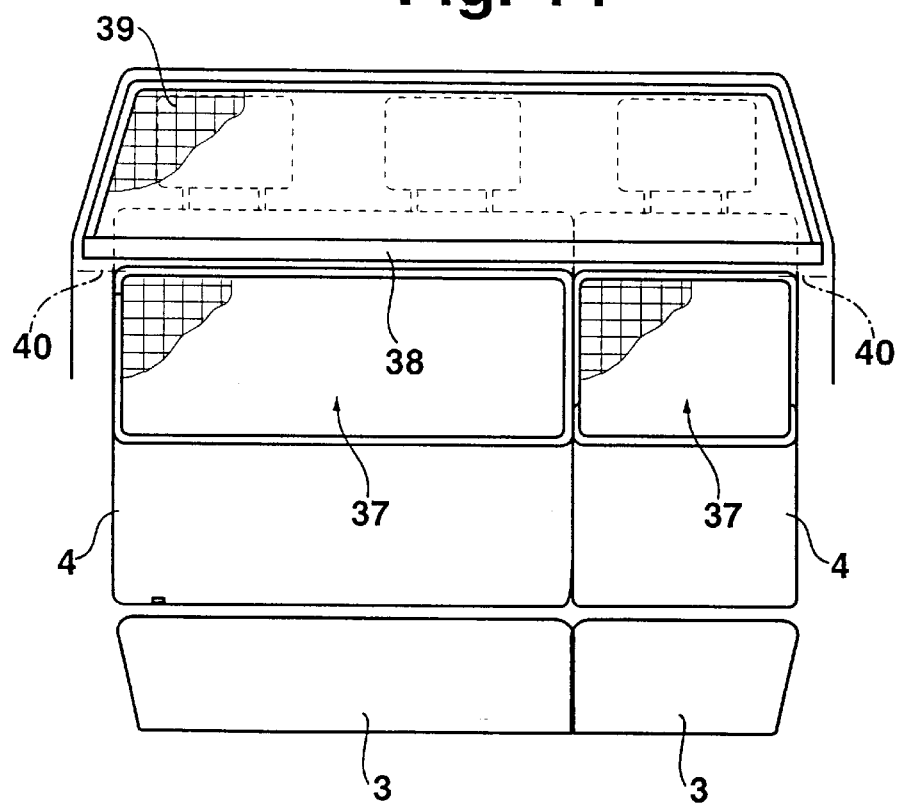
FIG. 14 shows a view of a protective device according to FIG. 13 looking in the direction of arrow (XIV) in FIG. 13.

The protective device according to FIGS. 13 and 14 likewise has a frame (37) which, like the protective devices in FIGS. 9 to 12, has two separate frame parts each associated with a portion (4) of a backrest. All of the frames described with reference to the embodiments, and thus frames (37) as well, are designed as closed tubular structures and provided with a flat structure, stretched within the tubular structure, in the form of a safety net. The two frames (37) are secured in a pivotably movable fashion on a pivot axis (40) on backrest (4). In their resting position they lie flush against the back of backrest (4). A latch is provided for this resting position but is not shown. Above frame (37), on backrest (4), a roller-shade housing (38) is also provided for a safety net (39) that can be rolled up, with roller-shade housing (38) being releasably mounted in swallowtail guides on backrest (4). With backrest (4) upright, safety net (39) of roller-shade housing (38) serves exclusively to separate the cargo area and passenger area. For this purpose, corresponding mounts are provided on the roof in a manner that is known of itself and therefore not described in greater detail, in which mounts safety net (39) can be suspended. In order to permit separation of the passenger area and cargo area when backrest (4) is folded forward into a horizontal position, frame (37) has on its side abutting pivot bearing (40) a retaining mount (41) for roller-shade housing (38), said mount in the embodiment shown being likewise made in the shape of a swallowtail guide. In order to bring the protective device into a correct protective position even when backrest (4) is folded forward, frame (37) is pivoted upward in simple fashion. Then roller-shade housing (38) is mounted on retaining mount (41) located at the upper end of frame (37) and then pulled out upward over safety net (39) and suspended in the corresponding forward mounts on roof (18). In order to achieve a definite and stable positioning of frame (37), latches are provided in the vicinity of pivot bearing (40) for this vertically deployed protective position of frame (37), said latches being made in particular in the form of locking latches.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Protective device for an interior of a motor vehicle, with a flexible flat structure that can be transferred from at least one stored resting position into at least one protective position that separates a cargo area from a passenger area and back into the at least one resting position, wherein the flexible flat structure is stretched in a rigid frame mounted to move between the resting position and the protective position, wherein a smaller additional frame is integrated in the rigid frame, said additional frame being mounted to move on the rigid frame and being transferable into an additional frame protective position and an additional frame resting position independently of the rigid frame.

2. Protective device according to claim 1, wherein a height of the frame is greater than the distance between a roof of the motor vehicle and backrests of front seats or rear seats.

3. Protective device according to claim 1, wherein the frame is mounted pivotably on at least one backrest of a rear seat.

4. Protective device according to claim 1, wherein the frame is mounted on at least one backrest of a rear seat so that the frame is linearly displaceable parallel to the backrest.

5. Protective device according to claim 1, wherein the latches for the additional frame protective position and the additional frame resting position are provided on said frame.

6. Protective device according to claim 5, wherein the end stops are provided for the additional frame resting position and the additional frame protective position.

7. Protective device according to claim 1, wherein the frame has retaining mounts for a roller-shade housing of a safety net that can be pulled out.

8. Protective device for an interior of a motor vehicle, with a flexible flat structure that can be transferred from at least one stored resting position into at least one protective Position that separates a cargo area from a passenger area and back into the at least one resting position, wherein the flexible flat structure is stretched in a rigid frame mounted to move between the resting position and the protective position, wherein a flexible covering is located on an underside of the frame, said covering, in a forward protective position of said frame, covering a space between front seats of the motor vehicle below said frame, with the covering being associated with a mount that is integral with a floor of the motor vehicle to secure the covering in its protective position.

9. Protective device for an interior of a motor vehicle having a front seat, a rear seat, and a roof, said protective device comprising:

a rigid frame including first and second cross members and a flexible flat structure extending therebetween;

a first latching receptacle disposed on said roof approximately above said front seat; and a second latching receptacle disposed on said roof approximately above said rear seat, said cross members being engageable with and disengageable from said latching receptacles, said cross members being pivotable in said latching receptacles when engaged therewith, said frame being pivotable between a stored position and each of a front seat protective position and a rear seat protective position, wherein said first cross member is engaged with said first latching receptacle and said second cross member is engaged with said second latching receptacle in said stored position, wherein said frame extends between said first latching receptacle and said front seat in said front seat protective position, and wherein said frame extends between said second latching receptacle and said rear seat in said rear seat protective position.

10. Protective device according to claim 9, wherein said frame and said latching elements are configured and arranged such that:

said frame is pivotable from said stored position to said front seat protective position by disengaging said second cross member from said second latching receptacle and pivoting said frame forward about said first cross member into engagement with said front seat; and said frame is pivotable from said stored position to said rear seat protective position by disengaging said first cross member from said first latching receptacle and pivoting said frame rearward about said second cross member into engagement with said rear seat.

11. Protective device according to claim 9, further comprising a third latching receptacle disposed on said roof behind said rear seat.

12. Protective device according to claim 11, wherein said frame and said latching elements are configured and arranged such that said frame is pivotable between said rear seat protective position and a second stored position in which said second cross member is engaged with said second latching receptacle and said first cross member is, engaged with said third latching receptacle.

13. Protective device according to claim 12, wherein said frame and said latching elements are configured and arranged such that said frame is pivotable from said rear seat protective position to said second stored position by pivoting said frame rearward about said second cross member until said first cross member engages said third latching receptacle.

14. Protective device for an interior of a motor vehicle having a roof, a seat located in a passenger area, and a cargo area, said protective device comprising:

a rigid frame movably mounted on at least one of said roof and said seat; and a flat structure mounted across said rigid frame, said rigid frame and said flat structure being movable between at least one stored position and at least one protective position, and said rigid frame and said flat structure separating the cargo area from the passenger area in said protective position.

15. Protective device according to claim 14, wherein said rigid frame and said flat structure are located proximate one of said roof and said seat in said stored position.

16. Protective device according to claim 14, wherein said rigid frame and said flat structure extends between said seat and said roof in said protective position.

17. Protective device according to claim 15, wherein said rigid frame and said flat structure extends between said seat and said roof in said protective position.

18. Protective device according to claim 14, wherein said rigid frame is locked to said seat and said roof in said protective position.

19. Protective device for an interior of a motor vehicle having a front seat, a rear seat with a backrest foldable forward from a generally upright position into a generally horizontal position, and a roof, said protective device comprising:

- a rigid main frame pivotably disposed about a pivot bearing proximate an upper edge of said rear seat, said main frame having an outer periphery; and
- an additional frame integrated in said main frame, said additional frame being movable between a storage position located inside of said outer periphery and a protective position outside of said outer periphery,
- wherein said main frame and said additional frame are configured and arranged such that said additional frame extends between said pivot bearing and said roof when said backrest is in said generally upright position, and
- wherein said main frame and said additional frame are configured and arranged such that said outer periphery extends between said pivot bearing and said roof when said backrest is in said generally horizontal position while said additional frame is located in said storage position inside of said outer periphery.

20. A protective device according to claim 19, wherein said additional frame is pivotable about said pivot bearing between said storage position and said protective position.

21. A protective device according to claim 19, wherein said additional frame is linearly slidable between said storage position and said protective position.

* * * * *